Oct. 22, 1929.  A. S. NELSON  1,732,482
PLOW
Filed July 21, 1928
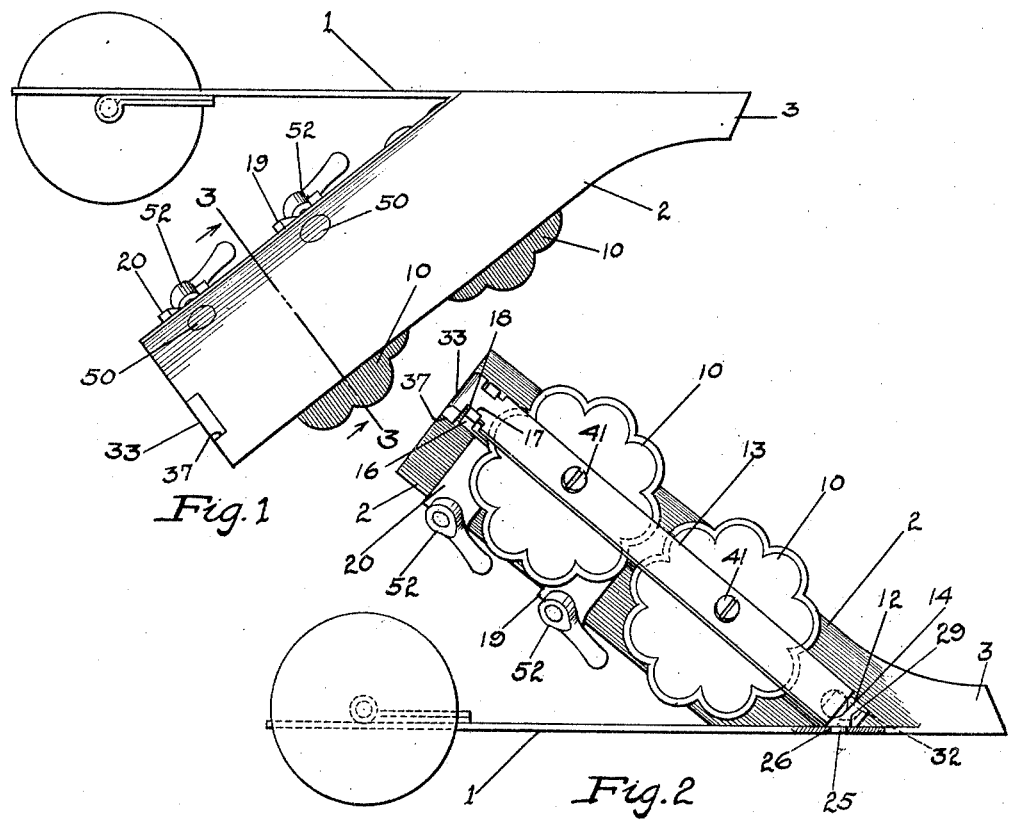
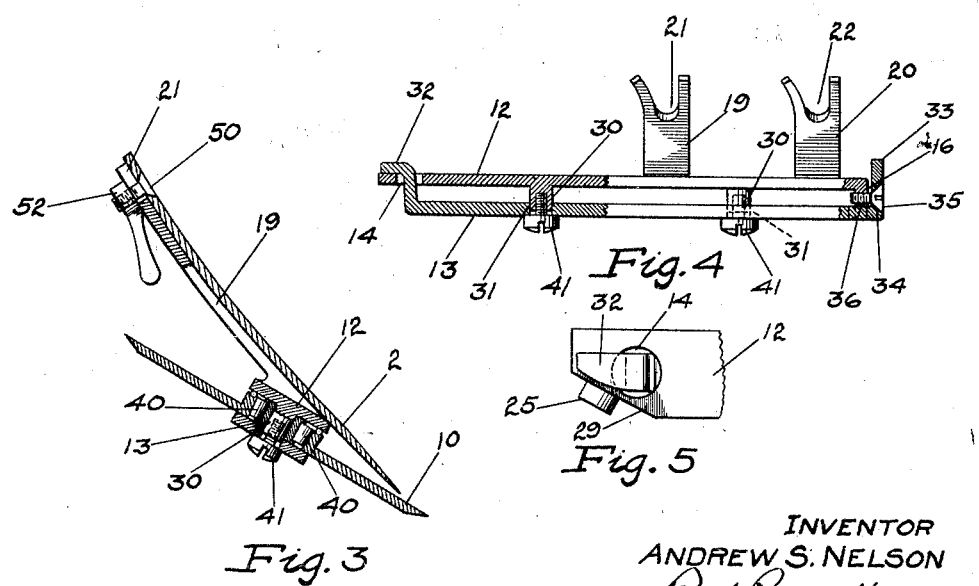
INVENTOR
ANDREW S. NELSON
By *Paul Paul H Moore*
ATTORNEYS Patented Oct. 22, 1929

1,732,482

UNITED STATES PATENT OFFICE

ANDREW S. NELSON, OF MAPLE PLAIN, MINNESOTA

PLOW

Application filed July 21, 1928. Serial No. 294,352.

This invention relates to improvements in plows, and is an improvement of the invention described in my copending application filed August 9th, 1926, Serial Number 128,177; which has matured into Patent No. 1,686,874, granted Oct. 9, 1928.

General objects of the invention are to provide means in connection with the moldboard of a plow, for cutting roots.

An important feature of the invention is the manner of mounting root severing cutter disks. In the above entitled application, these disks were pivoted directly to the moldboard so that it was necessary to modify a plow considerably, in order to attach the disks, and it was further necessary to overturn the plow. The present device provides means whereby the disks are mounted upon an element, which is separable from the plow, the arrangement being such that the disks have no direct connection with the plow, but can be mounted and adjusted independently of the plow, and then connected while the plow is in its working position.

Features of the invention include the details of construction, as well as the broad idea of means for mounting the cutting disks upon an attachable element, so that the disks can be applied to this element, and then this element can be detachably but rigidly secured to the plow. By this device, a very slight amount of machine work is required in order to make this rigid attachment of the cutting disks, after they have been properly mounted in the separable element. Features also include the details of construction.

Objects, advantages and features of the invention will be set forth in the description of the drawings forming a part of this application, and in said drawings Figure 1 is a top plan view illustrating one embodiment of the invention;

Figure 2 is a bottom plan view;

Figure 3 is a vertical section taken substantially on line 3—3 of Figure 1;

Figure 4 is a sectional top plan of the disk-carrying device, detached; and

Figure 5 is a detail view of one end of the disk-carrying element, or mount.

The representation of the plow structure is somwhat diagrammatic, but it will be understood that the invention can be applied to any standard plow.

The numeral 1 represents the landside of the plow. 2 represents the moldboard and 3 the point. An object of the invention herein is to provide means for mounting the disks so that they can be removed while the plow is resting upon the ground. This is obviously a great advantage, when only one man is working. He can change or inspect the disks, which he could not heretofore do, because it was necessary for him to turn the plow. The device is adapted for plows ranging in weight from forty-five to six hundred pounds, and can be applied to any standard plow.

The cutter disks which are indicated at 10 are herein mounted upon a separable element, the construction of which is most clearly seen in Figure 4. This element consists herein of two bars respectively designated 12—13, but an element as a single piece can be used, without departing from the spirit of the invention. The bar 12 is provided with an opening 14 and is also provided with a right-angular extension 16 slotted as at 17 to cooperate with notches 18 of the bar 13, see Figure 2. The element 12 also has attaching extensions 19—20 which are curved to conform to the configuration of the inner surface of the moldboard as shown in Figure 3, lying flatly against this inner surface as shown. Each element is terminally slotted respectively at at 21—22, and each slot in this instance is slightly curved. The center of curvature of the slots is at the lug 25, see Figures 2 and 5. The elements 19—20 secure the disk mount against movement away from the moldboard, but the connection 25—26 also assists in this function.

This lug is adapted to enter an opening 26 of the landside, and is one of the connections by which the disk-carrying element is detachably secured. The connection of 25 with the landside 1 is such as to permit a swinging motion of the disk-carrying element about it as a pivot. The element 12 is beveled as shown at 29 to fit flatly against the landside. Figure 5 shows that the element 25 projects in a direction substantially perpendicular to this surface. Of course, the angle of projection may vary according to the type of plow upon which the device is used. It will be understood that there is no intention to limit the invention to the exact angular relation of the parts in this case or for that matter to the exact construction of this connection. All that is necessary is that the inner end of the disk-supporting element be detachably connected so that it cannot become disengaged during normal operation. The element 12 is in this instance provided with bearing studs 30 which enter openings 31 of the element 13. The element 13 is provided with a kind of hook generally indicated at 32 which enters the opening 14 substantially in the manner shown, to form a detachable connection between the elements 12—13. The opposite end of the element 13 has a portion bent at an angle to provide an extension 33 and this extension has an opening 34 through which a screw 35 is passed, which screw is in threaded connection with an opening 36 of the slotted extension 16 of the element 12. The moldboard is slotted as at 37, and the extension 33 lies therewithin and flush with the surfaces of the moldboard. The connections 25—26 and 33—37 are principally to prevent lengthwise motion of the disk mount. The disks 10 are in this instance provided with roller bearings 40 which slide over the studs 30 as best shown in Figure 3. Screws 41 passing through openings 31 in the element 13 have threaded engagement with the studs to secure the bars against movement away from one another. The angular relation of the disks to the moldboard may be changed without departing from the spirit of the invention, which when stripped of the details consists in the provision of means, as an attachment, upon which the disks can be mounted, adjusted, and which can be applied and secured in operative relation to the plow.

It will be noted that the extensions 19 are elongated so that they will lie at an easily accessible level in this instance adjacent the top edge of the moldboard. This is a feature of the invention. The moldboard is bored and a screw 50 is passed therethrough and a handled clamping nut 52 secures the elements 19—20 in position.

Whatever the angular relation of the bar or of the disk, the bar should be placed at some level above the lower edge of the moldboard. Of course, the axial angle of the stud 25 will vary so that the proper connection can be made with the moldboard.

Features of the invention also include the details of construction.

I claim as my invention:

1. In combination with a plow including a land side and moldboard, a pair of bars having disks rotatably mounted therebetween, said disks being disposed to have their edges project outwardly beyond the lower edge of the moldboard, and said bars being detachably connected at one portion with the landside and at another portion with the moldboard.

2. In combination with a plow including a land side and moldboard, a pair of bars having disks rotatably and detachably mounted therebetween, said disks being disposed to have their edges project outwardly beyond the lower edge of the moldboard, and said bars being detachably connected at one portion with the landside and at another portion with the moldboard.

3. In combination with a plow including a land side and moldboard, a bar having disks rotatably mounted thereon, said disks being arranged to project outwardly beyond the lower edge of the moldboard, said bar being detachably connected by one portion with the landside adjacent the point of the plow, and being detachably connected by another portion to the moldboard, and at a point which is readily accessible from a point adjacent the top of the moldboard.

4. In combination with a plow including a land side and moldboard, a pair of bars having disks rotatably and detachably mounted therebetween, said bars being detachably connected in a manner to secure the disks for rotation, and said bars being detachably connected by one portion to the landside, and by another portion with the moldboard.

5. In combination with a plow including a land side and mold board, a pair of bars having disks rotatably and detachably mounted therebetween, said bars being detachably connected in a manner to secure the disks for rotation, and said bars being detachably connected by one portion to the landside, and by another portion with the moldboard, the connecting points of the bars with the moldboard being accessible at a level adjacent the top of the moldboard.

6. In combination with a plow including a land side and moldboard, a pair of bars having disks rotatably and detachably mounted therebetween, said bars being detachably connected in a manner to secure the disks for rotation, and said bars being detachably connected by one portion to the landside, and by another portion with the moldboard, the connecting points of the bars with the moldboard being accessible at a level adjacent the top of the moldboard.

7. In combination with a plow including a land side and moldboard, a bar having disks rotatably mounted thereon, said disks being arranged to project outwardly beyond the lower edge of the moldboard, said bar having a detachable socketed connection with the landside at one terminal and near the point of the plow and having extensions connecting it at another portion to the moldboard, more remote from the point, said extensions being connected to be readily accessible from a point adjacent the top of the moldboard.

8. In combination with a plow including a land side and a moldboard, of a pair of bars detachably secured together, cutter disks secured between the bars for rotation, and arranged to lie beneath and project beyond the moldboard, means at opposite ends of the bars for detachably securing them to the plow, said means being connected at one portion to the landside and the other to the moldboard, and additional means detachably securing the bars, said means being accessible from a point adjacent the level of the top of the moldboard.

In witness whereof, I have hereunto set my hand this 17th day of July, 1928.

ANDREW S. NELSON.